United States Patent [19]

Gormish et al.

[11] 4,173,850

[45] Nov. 13, 1979

[54] METHOD FOR REDUCING TANGENTIAL FORCE VARIATION IN PNEUMATIC TIRES

[75] Inventors: Kenneth J. Gormish, Tallmadge; Clarence Hofelt, Jr., Hudson, both of Ohio

[73] Assignee: The General Tire & Rubber Company, Akron, Ohio

[21] Appl. No.: 900,399

[22] Filed: Apr. 26, 1978

Related U.S. Application Data

[62] Division of Ser. No. 614,381, Sep. 18, 1975, Pat. No. 4,128,969.

[51] Int. Cl.² .................................................. B24B 1/00
[52] U.S. Cl. .............................. 51/281 R; 51/106 R; 51/165 R; 51/DIG. 33
[58] Field of Search .................. 51/165 R, 106 R, 281, 51/DIG. 33

[56] References Cited

U.S. PATENT DOCUMENTS

| | | | |
|---|---|---|---|
| 2,920,481 | 1/1960 | Hulswit | 51/DIG. 33 |
| 3,375,714 | 4/1968 | Bottasso | 51/DIG. 33 |
| 3,553,903 | 1/1971 | Christie | 51/106 R |
| 3,724,137 | 4/1973 | Hofelt | 51/106 R |
| 3,841,033 | 10/1974 | Appleby | 51/106 R |

OTHER PUBLICATIONS

"High Speed Uniformity-Variations", S.A.E. publication, #720464 dated May 22, 1972 - All pages.

*Primary Examiner*—Harold D. Whitehead

[57] ABSTRACT

A method and apparatus for reducing tangential force variation in a pneumatic tire wherein the tire is mounted on a wheel rim, inflated to operating pressure, and rotated under a predetermined load against a loading drum. Force transducers on the axis of the loading drum measure the tangential force variation as the tire rotates. These measurements are placed into the memory of a computer. The computer processes this data to obtain the magnitude of the tangential force variation and the phase angle from an arbitrary location of the variation or the angular displacement to the point of maximum magnitude. The computer outputs a V-shaped ramp voltage level signal for controlling the servo-valve which moves a rotary grinder into grinding engagement with the inner tread ribs of the tire. The grinding is repeated for a number of revolutions depending upon the magnitude of the variation.

1 Claim, 5 Drawing Figures

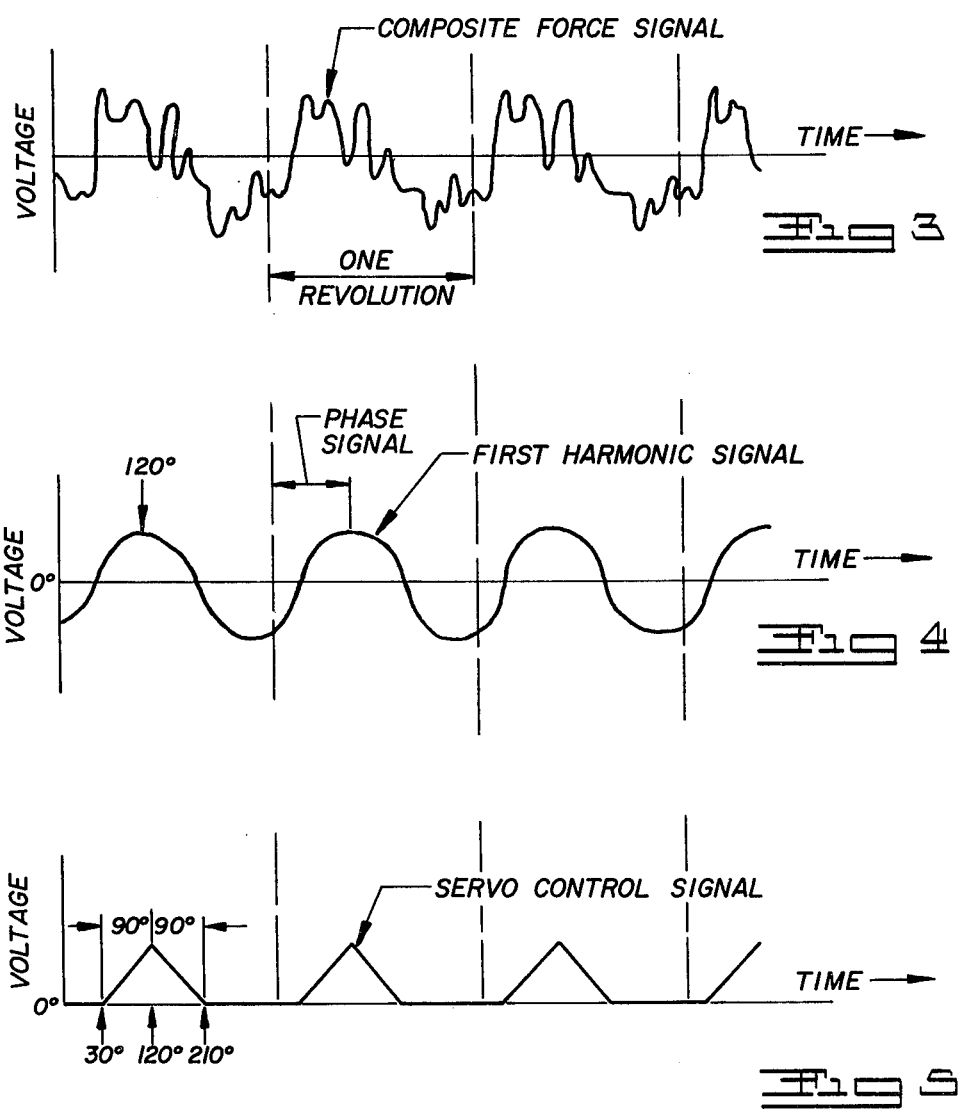

METHOD FOR REDUCING TANGENTIAL FORCE VARIATION IN PNEUMATIC TIRES

This is a division, of application Ser. No. 614,381 filed Sept. 18, 1975 and now U.S. Pat. No. 4,128,969 dated Dec. 12, 1978.

BACKGROUND OF THE INVENTION

1. Field of the Invention

This invention relates to post-cure processing of pneumatic tires in order to obtain optimum uniformity, and specifically to reductions of force variations in the tangential or running direction.

2. Description of the Prior Art

Due to non-uniformities in tire construction, it has been observed that extraneous forces and force variations are produced by the tire when the tire is rotating under load. Non-uniformities in the construction of the tire create moments and forces which can have an adverse effect upon tire ride and comfort.

Certain of these force variations are well known. The reduction of force variations in the radial direction is disclosed in U.S. Pat. No. 3,724,137. In radial force variation correction, the tire is mounted on a wheel rim, inflated to normal pressure, and rotated under a predetermined load against a loading drum. Radial force and radial force variation are measured on the loading drum by force transducers located in the radial direction on the axis of the loading drum. A pair of rotary grinders positioned adjacent the shoulder of the tire tread are moved into grinding engagement with the tread shoulder ribs in accordance with the radial force variations detected on the drum. These rotary grinders remove material from the shoulder ribs so that the tire becomes more uniform and the radial force variations are reduced to acceptable levels.

Due to the slowness of the response of the electromagnetic servo-system which controls the movement of the grinders, the tire is rotated at a fairly low speed. Typically, the tire is rotated at 60 rpm. This speed is sufficient to detect radial and lateral force variations since such variations exist independent of the speed at which the tire is rotated, in the absence of resonances.

It has been found that certain ride disturbances occur as a result of tire non-uniformities deriving from tangential or traction forces, or those forces parallel to the wheel plane in the direction of motion of the tire. These ride disturbances are evident with tires operating at all speeds. Automobiles equipped with radial or other types of tires have shown such ride disturbances at speeds between 0 and 80 mph, even with tires of minimal radial and lateral force variation characteristics. These ride disturbances take the form of a vehicle shake—generally a vibration felt once per wheel revolution being influenced by vehicle "wheel hop", and other vehicle resonances.

Tangential force variations or torque variations are speed dependent and may be generated by a change in angular acceleration of the tire which occurs over a portion of the circumference of the rotating tire. Speeds greater than 60 rpm and possibly in the order of 300 rpm or greater, equivalent to about 30 mph, are necessary for such tangential force variations to be accurately detected.

Current methods and apparatus for improving tire uniformity do not provide for reduction of tangential force variations but are rather concerned primarily with the reduction of radial force variations.

SUMMARY OF THE INVENTION

The method and apparatus of the present invention, however, provide for correction or reduction of adverse tangential force variations (to reduce ride disturbances). The ride disturbances are primarily vibrations heard and/or felt by the driver.

One of the objects of the present invention is to improve the uniformity of pneumatic tires.

Another object of the invention is to improve the post-cure processing of pneumatic tires to achieve optimum conditions of tire uniformity.

Yet another object is to improve the ride of pneumatic tires by reducing shake and roughness disturbances.

A further object is to sense and measure tangential force variations and to reduce those variations to acceptable levels.

A still further object is to improve the tire uniformity correction process by providing for an additional function of reducing tangential force variations in the tire as it is rotated in a tire uniformity correction machine.

Still another object is to provide a method for rapidly reducing tangential force variations automatically on a production-line high speed tire uniformity machine.

These and other objects and advantages are achieved by the unique method and apparatus of the present invention wherein a pneumatic tire is mounted on a rim, inflated, and rotated under a predetermined load against a loading drum. As the tire is rotated, force transducers operatively associated with the drum located on the drum axle in the tangential direction sense and measure tangential force variations. The voltage output from these force transducers is fed into a computer which calculates the magnitude of the tangential force variations and the phase angle from a reference point on the tire or the angular displacement to the point on the tire at which the variations are at a maximum. In accordance with these calculations, the computer outputs a V-shaped ramp voltage level signal for controlling a servo-valve that moves a rotary grinder into grinding engagement with the inner ribs of the tire tread. The grinder removes material from these inner tread ribs so that the tire is made more uniform and the tangential force variations are reduced. Grinding is continued for successive revolutions until the tangential force variations are reduced to acceptable levels.

BRIEF DESCRIPTION OF THE DRAWINGS

FIG. 3 is a graph illustrating the voltage level signal which represents the composite tangential force variations produced as the tire rotates;

FIG. 4 is a graph illustrating the first harmonic of the signal of FIG. 3; and

FIG. 5 is a graph illustrating the voltage level control signal produced by the computer in response to the signal of FIG. 4.

DESCRIPTION OF THE PREFERRED EMBODIMENT

Figure 1:
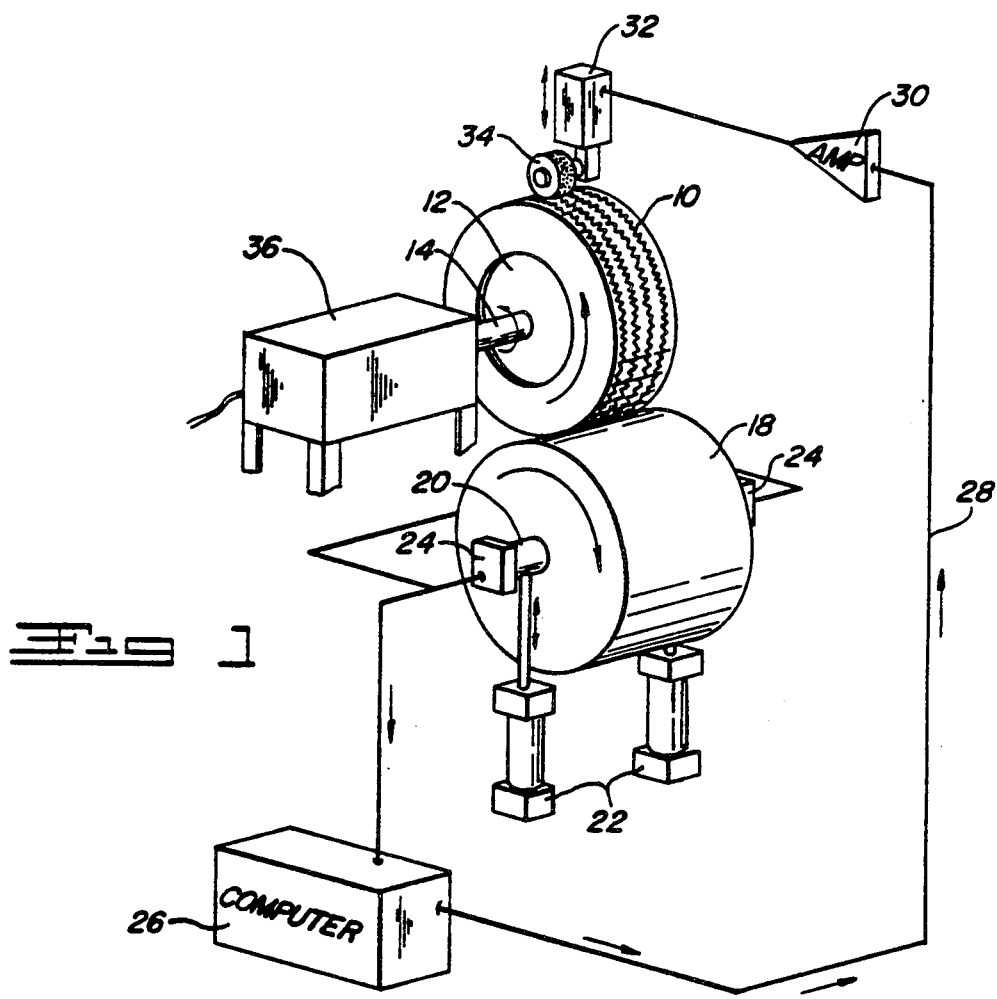
FIG. 1 is a schematic diagram illustrating a tire uniformity machine adapted to practice the method of the present invention.

Referring more particularly to the drawings and initially to FIG. 1, there is shown by a schematic representation a typical tire uniformity machine modified to practice the method of the present invention. A tire 10 is mounted and inflated on a rim, such as a solid or split rim 12 or an ordinary car wheel, carried on an axle 14 turned by a variable-speed rotary drive means (not shown). The drive means is capable of rotating the tire at speeds typical of conventional tire uniformity machines, such as 24 or 60 rpm for measuring radial and lateral force variations and conicity. In addition, the drive means should have sufficient power to rotate the tire at a higher speed. A speed of at least 300 rpm and preferably at least 800 rpm is necessary in order to produce accurately measurable tangential force variations. Both speeds can be achieved with a dual-speed motor or with a separate motor added to a conventional machine with a clutching or similar device.

A loading drum 18 having a circumferential surface is mounted for free rotation on a non-rotating axle 20. Loading means, such as a pair of hydraulic cylinders 22 connected to the drum axle 20, are used to move the loading drum 18 into contact with the tire 10 and to apply a predetermined deflecting load. A pair of load cells 24 are mounted on the drum axle 20. In conventional tire uniformity machines, the load cells 24 contain sensors, such as strain gauges with flexures, which measure forces in the radial and lateral direction. In order to measure tangential forces, the load cells 24 should also have sensors mounted to measure the forces on the drum in the tangential direction, or the horizontal direction in which the tire is rolling. These sensors produce a voltage level signal representative of the tangential force variation. Although, tangential force sensors on the drum axle 20 are preferred, the tangential force variations may be measured in other ways such as by a torque measuring device between the drive means and the tire.

The output of the tangential sensors in the load cells 24 is fed into a computer 26. Preferably, the computer 26 is a digital computer of the minicomputer class. A minicomputer is preferred due to its widespread availability and relative inexpensiveness. However, this does not restrict the use of other devices, such as those of an analog nature. As will be explained in greater detail hereinafter, the computer 26 receives and interprets the tangential force variation signal, and stores this information in its memory. Later, the computer produces a control signal for controlling the grinding of the tire in accordance with the tangential force variation signal.

The computer 26 outputs the control signal on line 28. This signal is fed through a servo-amplifier 30 to actuate a servo-valve 32. The servo-valve 32 moves the rotary grinder 34 into grinding engagement with the inner ribs of the tread of the tire 10. A special grinding wheel or other cutting device of proper dimensions to touch each of the inner tread ribs is used to remove the tread material from the inner or rider ribs of the tire. A narrower grinder which moves laterally across the tread ribs could also be used. The outer or shoulder ribs of the tire tread are not touched by the center rib grinder, unlike the corrective grinding done to reduce radial and lateral force variations. One or more of the inner ribs may be ground individually as well as all of the inner ribs.

The method of the prevent invention involves rotating the tire at two different speeds. Two speeds are required because tangential force variations reach measurable levels only when the tire is rotated at high speeds, but it is not practical to operate the rotary grinder at high speeds due to the relative slowness of response of the grinder control electromagnetic servo-system. Therefore, the tire 10 is first rotated at a higher speed to measure the tangential force variations. These measurements are stored in the memory of the computer 26. The tire is then run at a lower speed, at which time the computer 26 outputs the proper control signal to the servo-valve 32 to move the grinder 34 into engagement with the tire 10 to grind to reduce the tangential force variations.

The specific steps of the preferred method of the present invention are as follows. First, a tire 10 is mounted in the rim 12 and inflated, as previously described. The tire is rotated against the loading drum 18 under a predetermined load, and the radial force variations are reduced using conventional methods. The speed of the tire 10 is then increased to a high speed. In order to properly detect the tangential force variations, the high speed should be greater than 300 rpm which corresponds to a vehicle speed of about 30 mph. Preferably, the drum is rotated at a speed of 840 rpm, corresponding to a tire speed of about 70 mph. Tangential force variations are detected by the load cells 24 and the voltage level signals representing these force variation measurements are fed into the computer 26. A typical tangential force variation signal is illustrated in FIG. 3.

The computer 26 is programmed to accomplish Fourier analysis on the tangential force variation signal to determine the harmonics of the tangential force variations. With the availability of low-cost programmable minicomputers, this has been found to be the preferred method of obtaining the first harmonic of the tangential force variation. However, other known methods of obtaining the first harmonic signal may also be used. For instance, a suitable first harmonic filter may be employed, such as a filter of 36 db per octave or similar characteristics with a cutoff frequency at the tire rotational speed. For a tire rotating at 600 rpm, such a filter would cut off at about 10 Hz and attenuate the signal 36 db at 20 Hz. Several available commercial harmonic analysis devices could be used as well. The phase displacement of the signal by the harmonic analysis device must be compensated for in all cases.

The first harmonic of a tangential force variation is preferably used to correctly grind the tire. FIG. 4 shows the first harmonic signal corresponding to the composite tangential force variation signal of FIG. 3. First harmonic force correction is preferred because the first harmonic is the major cause of the undesirable shake. However, the present method could also be applied to the composite force signal, any higher harmonic, or the inverse function of several harmonics. These are major causes of tire roughness.

The computer 26 compares the maximum magnitude of the first harmonic with a predetermined acceptable level. If the maximum magnitude is less than the acceptable level, no correction is needed. The tire is satisfactory and ready for use, and it is removed from the machine. If the magnitude exceeds the acceptable level, the procedure to reduce the tangential force variations is performed.

Figure 2:
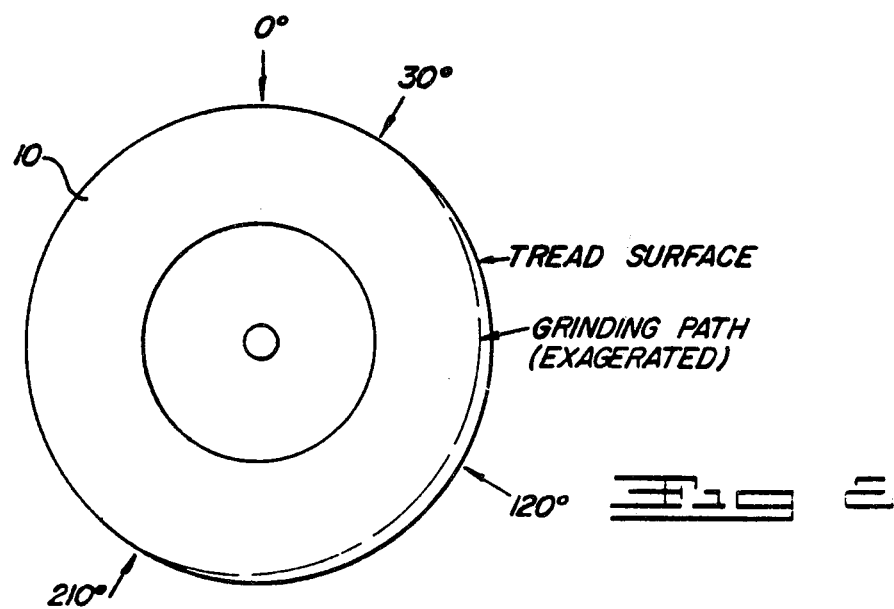
FIG. 2 is a diagram of a side elevation of a pneumatic tire illustrating the corrective grinding accomplished to reduce the tangential force variations.

In addition to the magnitude of the first harmonic of the tangential force variation, the computer also determines the phase angle. The "phase angle" is defined as the angular displacement in degrees from an arbitrary location on the tire to the position of the maximum positive magnitude of the first harmonic of the tangential force variations. An example of a phase angle is shown in FIG. 4 On the tire of FIG. 2, the arbitrary location from which the phase angle is measured is at the top of the tire and is designated 0°. In this example, the phase angle of the tire of FIG. 2 is 120°. The first harmonic signal of FIG. 4 corresponds to the tire of FIG. 2. The phase angle or angular distance to the position of maximum positive magnitude of the first harmonic signal of FIG. 4 is also 120°.

After the tangential force variations have been measured at the high speed and the magnitude and phase angle of the first harmonic have been stored in the memory of the computer 26, the speed of the tire 10 is reduced to a slower speed. A typical speed for production tire correction is 60 rpm. This speed is fast enough for efficient production activity and slow enough to accommodate the response times of the servo-system. At the slow speed, the computer 26 is programmed to produce a servo-control signal from the data stored therein.

The servo-control signal produced by the computer is a V-shaped ramp function. FIG. 5 illustrates the control signal produced in response to the first harmonic signal of FIG. 4. The peak of this V-shaped ramp corresponds to the phase angle of the first harmonic of tangential force variation. The ramp begins at a point 90° before the location of the peak, and the ramp ends at a point 90° after the location of the peak. In the example of FIG. 5 where the phase angle is 120°, the ramp begins at the point of 30°, increases to the point of 120° and then decreases to zero at the point of 210°.

The control signal is output by the computer 26 onto line 28. This signal is put through the servo-amplifier 30 to actuate the servo-valve 32 and bring the rotary grinder 34 into grinding engagement with the inner rib or ribs of the tread of the tire 10. The V-shaped ramp combined with the practical aspects of grinding rubber with a grinding wheel results in a good approximation of a sine wave. The rotary grinder 34 grinds off excessive rubber along the inner ribs of the tread in accordance with the tangential force variations measured at the high speed. The grinder engages the tire from a point 90° before the location of the positive maximum magnitude of the tangential force variation to a point 90° after the location of the positive maximum.

In the example of FIG. 2 where the phase angle is 120°, grinding is begun at the point on the tire corresponding to 30°. The grinder does not touch the tire between the 0° point and the 30° point. The grinder just touches the tire at the 30° point and goes successively deeper into the tire until it reaches the point of maximum positive magnitude of the first harmonic, corresponding to 120°. Maximum cutting is accomplished at the 120° point. From the 120° point to the point corresponding to 210°, the grinder retracts successively so that at the 210° point it is just touching the tire. From the 210° point back to the 0° point the grinder does not touch the tire.

It is not necessary to follow the free radial run-out pattern of the tire as is done in the reduction of radial force variations. Proper grinding can be obtained by setting the grinder adjacent to, but not touching, the inner ribs of the tire treads, and causing the grinder to move in the proper distance in accordance with the measured tangential force variations.

The grinding or cutting process is repeated during successive revolutions with the number of revolutions being determined by the magnitude of the force to be reduced. The grinder 34 is then retracted, and the tire 10 is speeded up to the high speed and new values of the tangential force variations are measured. If the values of the force variations are now acceptable, the tire is removed from the machine. If the values are beyond the acceptable limits, the process is repeated. Speed up for measurement and slow down for correction may be repeated as many times as desired. Also, for each type and design of tire, a "table" could be placed in the computer memory which would tell the number of grinding revolutions to reduce a specified force variation.

With high speed uniformity machines under computer control, this process can be carried out very rapidly. It is estimated that only a few seconds are necessary to correct each tire. Thus the method of the present invention may be applied to production tire corrections.

It is possible to measure and correct at the same speed. The limitation lies in the relative slowness of the response of the grinder control electromagnetic servo-system. However, a properly designed grinder system and the proper choice of servo-system components or equivalent systems may permit measurement and reduction at some higher speed at which tangential force variations may be measurable.

Other modifications and variations in the specific method herein shown and described will be apparent to those skilled in the art all within the intended scope and spirit of the invention. While the invention has been shown and described with respect to a specific embodiment thereof, this is intended for the purpose of illustration rather than limitation. Accordingly, the patent is not to be limited to the specific embodiment herein shown and described nor in any other way that is inconsistent with the extent to which the progress in the art has been advanced by the invention.

We claim:
1. In a method for reducing tangential force variations in a pneumatic tire, which comprises the steps of:
   (a) rotating the tire at a speed greater than 300 rpm against a predetermined load;
   (b) sensing and measuring the force variations in the tangential direction while the tire is rotating;
   (c) determining the magnitude of the tangential force variations and the location of maximum magnitude of tangential force variations;
   (d) comparing said magnitude to a predetermined level to determine if the force variations are within acceptable limits; wherein the improvement is characterized by:
   (e) grinding rubber only from the inner ribs of the tire at a reduced tire rotational speed at the location of maximum magnitude of the tangential force variations if the tangential force variations exceed acceptable limits.

* * * * *